US007811378B2

(12) United States Patent
Nungeβ et al.

(10) Patent No.: US 7,811,378 B2
(45) Date of Patent: Oct. 12, 2010

(54) QUICKLY DISINTEGRATING PIGMENT CONCENTRATE

(75) Inventors: Nikolaus Wolfgang Nungeβ, Neu-Isenburg (DE); Stefan Vogler, Walluf (DE)

(73) Assignee: Brockhues GmbH & Co., Walluff (DE)

( * ) Notice: Subject to any disclaimer, the term of this patent is extended or adjusted under 35 U.S.C. 154(b) by 1148 days.

(21) Appl. No.: 10/836,288

(22) Filed: Apr. 30, 2004

(65) Prior Publication Data

US 2005/0000389 A1 Jan. 6, 2005

(30) Foreign Application Priority Data

Apr. 30, 2003 (DE) ................................ 103 19 483

(51) Int. Cl.
*C09C 1/36* (2006.01)
*C09C 1/22* (2006.01)
*C09C 1/00* (2006.01)
*C04B 14/00* (2006.01)

(52) U.S. Cl. ........................ 106/499; 106/447; 106/456; 106/460; 106/480

(58) Field of Classification Search ................. 106/460, 106/437, 456, 712, 499, 480, 447; 524/413, 524/424

See application file for complete search history.

(56) References Cited

U.S. PATENT DOCUMENTS 3,520,656 A * 7/1970 Yates et al. ................. 423/345
4,045,385 A * 8/1977 Klein et al. ................. 524/188
4,349,389 A * 9/1982 Schofield .................... 523/200
4,478,819 A * 10/1984 Hercelin et al. ............. 424/457
4,535,003 A * 8/1985 Ogawa et al. ............ 427/207.1
5,158,764 A * 10/1992 Again et al. .................. 424/58
5,211,958 A * 5/1993 Akkerboom et al. ........ 424/470
5,252,103 A * 10/1993 Kamata et al. ................. 8/554
5,648,306 A * 7/1997 Hahn et al. ................... 502/80
5,797,988 A 8/1998 Linde et al.
6,079,644 A 6/2000 Linde et al.
6,241,167 B1 6/2001 Linde et al.
6,432,196 B1 * 8/2002 Linde et al. ................. 106/712
6,506,722 B1 1/2003 Bauer et al.
6,547,870 B1 4/2003 Griessmann et al.
6,635,107 B2 * 10/2003 Egger et al. ................. 106/456

(Continued)

FOREIGN PATENT DOCUMENTS

CA 1059704 A1 8/1979

(Continued)

OTHER PUBLICATIONS

Schumacher, Horst. Opposition brief dated Dec. 5, 2008, in EP 1620512 and English translation.

*Primary Examiner*—Jerry Lorengo
*Assistant Examiner*—Pegah Parvini
(74) *Attorney, Agent, or Firm*—McAndrews, Held & Malloy, Ltd.

(57) ABSTRACT

The invention relates to a dispersible pigment concentrate, in particular for coloring of cement based building materials like concrete, and for coatings, paints and the like, that contains at least one pigment as well as, if necessary, bonding, dispersion and wetting agents, with a content of a disintegration agent, which, when contacting water (in sufficient amount), causes an essentially complete disintegration of the primary structure of the concentrate with subsequent release the pigment particle within one minute without any mechanical operation.

14 Claims, 8 Drawing Sheets

U.S. PATENT DOCUMENTS

| | | | | |
|---|---|---|---|---|
| 6,706,110 | B2 | 3/2004 | Egger et al. | |
| 7,008,912 | B1 | 3/2006 | Rettenmaier et al. | |
| 7,365,109 | B2 | 4/2008 | Rathschlag et al. | |
| 2001/0015388 | A1 | 8/2001 | Linde et al. | |
| 2002/0023571 | A1 * | 2/2002 | Rathschlag et al. | 106/415 |
| 2002/0185040 | A1 | 12/2002 | Egger et al. | |
| 2003/0175400 | A1 | 9/2003 | Schlosser et al. | |

FOREIGN PATENT DOCUMENTS

| | | | | |
|---|---|---|---|---|
| CA | 2295696 | | | 2/1999 |
| DE | 2536719 | A1 | | 3/1976 |
| DE | 19731698 | | | 1/1999 |
| DE | 19826624 | | | 12/1999 |
| DE | 19943237 | A1 | | 5/2001 |
| DE | 10002559 | | | 8/2001 |
| DE | 10003248 | A1 | | 8/2001 |
| DE | 10046152 | A1 | | 3/2002 |
| DE | 10211427 | A1 | | 10/2003 |
| EP | 0115898 | | * | 2/1984 |
| EP | 0657511 | | | 6/1995 |
| EP | 1118642 | | | 7/2001 |
| FR | 2607511 | | * | 6/1988 |
| GB | 2009204 | A | | 6/1979 |
| JP | 03112608 | | * | 5/1991 |
| WO | WO 98/40462 | A1 | | 9/1998 |
| WO | WO 01/53228 | | * | 7/2001 |

* cited by examiner

QUICKLY DISINTEGRATING PIGMENT CONCENTRATE

RELATED APPLICATIONS

We claim priority to German application no. 103 19 483.5 dated Apr. 30, 2003.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The invention relates to a quickly disintegrating pigment concentrate, in particular for coloring building materials such as concrete, as well as water-based paints and the like. The invention further relates to methods for coloring such materials with such pigment concentrates and the invention relates to the use of special cellulose products in such pigment concentrates.

The invention comprises a quickly disintegrating pigment concentrate which can be used for the coloring of building materials, like concrete, as well as for the coloring of water-based paints and the like. In particular the use of specific disintegration agents allows homogenous dispersion of the pigment in the material to be colored within very short mixing times and without the loss of color intensity. A further aspect of the invention is to keep the energy input needed for homogeneous dispersion of the pigment in the material, as small as possible to allow new and improved uses.

The subject matter of the invention is the use of a quickly disintegrating pigment concentrate for coloring dry mortar, cement-based building materials like ready-mixed concrete, roof tiles, and paving stones as well as the use of pigment concentrates for the coloring of paints, mulch, and paper, with the advantage, that the pigment concentrate begins to disintegrate immediately in the presence of water.

The invention further relates to dispersible filler products and like products, their use and the use of said cellulose products in such filler products.

The processing of pigments requires dispersion of the raw pigment material, with comminution of aggregates and agglomerates into pigment particles that fulfill the requirements for application in terms of particle size, in order to achieve optimal color development. This is true for inorganic pigments, which have been known for quite some time for the purpose of coloring building materials such as concrete and the like. However, pigments within the meaning of this invention can be any organic or inorganic pigments.

The common particle size of pigments is in the range of 0.01 μm to 0.9 μm. In commercially available products the pigments appear as agglomerates with a size of about 2-10 μm. Normally, the fraction remaining on a sieve with a mesh of 45 μm is 0.1% or less.

Typical granulates have a size of 200 to 1000 μm. In the final colored product, the pigment particles should again be present as single particles with a size of 0.01 to 0.9 μm.

If the coloration is to be even, the pigments or pigment concentrate should be added to the material to be colored, and dispersed therein homogenously while releasing the pigment particles. This is true for the coloring of dry materials as well as liquid ones. The solidified material contains the finely dispersed pigment particles and, thus, is homogenously colored throughout.

Important characteristics of the coloration to be achieved are color intensity and brilliance.

The properties of pigment concentrates are determined by requirements which are relevant to the different processing steps, from the formulation of the pigment product through intermediate products to the solid, colored material; however, all of them are interrelated and determine each other.

Thus, on the one hand, pure pigments would be preferred, due to their potential color intensity and brilliance of the coloration, because the pigment content is not diluted by additives. On the other hand, such powders behave poorly in processing, since they give off a lot of dust, tend to adhere to packing material, machinery parts and the like due to the fineness of their particles, and therefore, are hard to meter in the dosing equipment, due to blockage and bridging. Additionally, the flowability of pure pigment powders is insufficient.

When dispersing the pigments into the material to be colored, powders can also cause considerable problems, for example by forming pigment clumps ("nests"), which are not broken in the dispersing process and which become visible at the surface of the solidified, colored material. This is not only optically unfavorable (low development of color intensity, uneven coloration), but technically disadvantageous as well, because such pigment clumps do not have the required mechanical stability and can easily be eroded or washed out, which then results in open pores on the surface of the material and consequently leads to flaws in the surface of the finished material.

The need to apply high energy input to achieve homogenous dispersion of a pigment concentrate is not advantageous under various aspects. On the one hand, the use of mixing devices with high energy consumption is economically unfavorable; on the other hand, smaller building sites or manual operators often do not have intensive-mixing devices at their disposal, which renders therefore the incorporation of the pigment concentrate on site difficult or even impossible. A homogeneous coloration of the material without high mechanical energy application would for example, if used in dry mortar, facilitate and accelerate processing.

Similar considerations apply for other solid particles in building materials like fillers and the like, for concrete, mortar and cement. One example is calcium carbonate, which is used as a filler for concrete. Such solid components, like pigments, should be homogeneously dispersed as fast as possible and as effective as possible during mixing. The invention is suitable for such applications as well as for pigments. The following description, which refers to pigments, is applicable to such other solid components.

In order to avoid dust, improve metering and the overall flow properties, and to achieve a qualitative uniform color impression, it has been known in the prior art to process pigment particles and suitable additives, into pigment concentrates. For example, coated powder products, compacted products, and build-up or spray granulates are known.

A pigment concentrate according to the invention is a material, in which at least one additive (e.g., a dispersing agent, a wetting agent, a bonding agent) is added to the pigment particles by a processing step forming either powders or enlarged aggregates or shaped bodies (e.g. a granulate, a pellet, a tablet). In the invention, a preferred form of pigment concentrate is a granulate.

In the context of this description, "granulates" comprise materials with an average grain size that has been increased, with respect to that of the raw materials, by a processing step. Therefore, "granulates" not only comprise spray granulates and compacted granulates, but also, e.g., products resulting from a moisture treatment with subsequent curing and comminution, and products obtained by dry or essentially dry processing steps, e.g. dry produced granulates, briquettes and such like with subsequent comminution. Dry products within the meaning of the present invention have a residual moisture content of up to about 10 wt.-%

In principle, two contrary characteristics are required for pigment granulates or other shaped bodies, such as tablets. The granulates or other shaped bodies should be mechanically stable, and, simultaneously, ought to show good dispersing properties in the medium to be colored. The mechanical stability is responsible for good transportation characteristics, both for transport to the user, as well as for good metering and flow properties in the dosing equipment on site, due to a reduced dusting. This stability is provided by strong adhesive forces and depends, e.g., on the nature and the amount of the bonding agent, and on the pressure applied for shaping during the production of the concentrate. Dispersibility is influenced by the quality of milling prior to granulation (wet and dry milling), by the mechanical energy input in manufacture (e.g. line forces) and by dispersing agents, which reduce the adhesive forces of the dry granulate during the incorporation into a medium. Herein, the use of larger amounts of dispersing agents is limited by the additive/pigment cost ratio. Additionally, increased content of additives results in a respective reduction of the pigment concentration. By this, the use of additives is limited as well. Such additives and/or auxiliary agents should not disadvantageously modify the properties of the material to be colored. For example, regarding concrete it should be considered that the addition of certain water-soluble materials is regulated, so that the mechanical properties of the cemented concrete (e.g. firmness, pressure resistance) are not affected. Therefore, it is difficult to predict, and should be very carefully evaluated, whether the benefits of an additive outweigh the (possible) disadvantages.

Various processing methods for pigment granulates, such as spray granulation (spray drying over disks or jets), build-up granulation (mixers, fluid bed granulators, dishes, and/or drums), or extrusion or compacting processing have been described in the prior art:

It is known from DE-A1 29 08 202, to use aqueous carbon preparations (having a water content of 30% to 80%) in pearl granulates for coloring purposes in the cement industry. These techniques cannot be used for other pigments, and granulates having such water contents are generally disadvantageous, also for the use in building materials.

From DE-A1 29 40 156 it is known to granulate pigments together with bonding agents by spray granulation. The pigment granulates produced in this way are used for the production of colored ink, the coloration of plastics, paints, and the like. There is no reference to the coloration of building materials, and the like.

Color granulates containing more than 5% water by weight and up to 50% water by weight are known from EP-A2 0 191 278. According to this reference, granulates with a lower water content are not suitable for building materials.

In DE-A1 36 19 363, pigment granulates suitable, for the coloration of building materials comprising other pigments rather than carbon, have been described for the first time. According to this prior art, micro-granulates made from such pigments are produced by mixing them with bonding agents and subsequent spray drying. The bonding agents in question are essentially organic bonding agents, such as, e.g., lignin sulfonate. These granulates are commercially successful.

In DE-A1 39 18 694, micro-granulates without any organic bonding agents have been suggested. Here, inorganic compositions, in particular, oxides and/or hydroxides and corresponding hydrates are used as bonding agents. Such products are often problematic in practical use, because they tend to disperse incompletely during the incorporation into concrete and the like.

EP-A1 0 567 882 describes build-up, compacted and spray granulates having bonding agents, such as particularly mineral oil, wax, paraffin, and the like, for the purpose of coloring asphalt. In addition to bonding agents, the use of materials such as lignin sulfonate, molasses, starch, and the like should be possible. According to this disclosure, materials such as lignin sulfonate alone cannot be used as bonding agents.

From EP-A1 0 657 511 it is known to produce pigment granulates, with lactose as the bonding agent, by spray drying, with a residual moisture below 2.5% by weight.

Extrusion processes for the production of pigment granulates are known from U.S. Pat. No. 6,562,120 and US 2004 0040469.

For the use of coated powders, WO 97/29892 can be named as an example for the state of the art.

An example for a paste-like pigment concentrate is given in WO 01/55050. In such concentrates the pigment particles are pre-dispersed, which is generally advantageous. These products are however disadvantageous in view of their relatively high liquid content (water), which can cause increased transport costs, stability problems during storage (sedimentation), and often causes susceptibility to decomposition processes (biological affection, formation of mold) as well as legal complications regarding storage.

Therefore the concentrates according to the invention are preferably dry.

The combination of pigment particles, on the one hand, with auxiliary agents, on the other hand, for the production of pigment concentrates generally proceeds by means of moist and/or wet mixing procedures, but can also be effected by dry mixing procedures and, if necessary, with subsequent further processing to different product shapes. Subsequently, the products (herein also called "concentrates") are not (any longer) present in the form of a mixed powder. The particles thus produced, comprising the pigment particles and at least one auxiliary agent, do not necessarily show a certain size. For example, they can be present as enlarged particles, which is typical for granulates; but they can also be processed by comminution methods, to achieve a fine particle concentrate. They include, for example, coated powders and shaped particles (e.g. granulate), more or less shaped by pressure or, if necessary, compacted, e.g. flakes or the like (including briquettes and other fairly big compacted bodies). In the technically most successful concentrates at present, they are homogeneous granulates, in particular spray granulates.

By using moist or wet mixing processes for the production of pigment concentrates, usability of the product can be affected.

On the one hand, the system of components for the production of the concentrate should be well mixable. This sometimes inhibits the utilization of auxiliary agents, which might otherwise be useful in later processing steps, for example, in combination with the materials to be colored. For example, if a liquid mixture for spray granulation is to be produced, the addition of the desired auxiliary agent to be added to the required concentrate should not excessively increase the viscosity of the mixture, because otherwise the mixing and spraying process is impeded and the concentrate cannot be produced with the required properties.

Additionally, the specific density of the concentrate as well as the relative ease, for water or other liquids, in penetrating the particles of the concentrate (granules), decisively influence the dispersibility.

To date, spray granulates provide the best combinations of properties in order to meet all requirements. Commercial products, such as, e.g., the GRANUFIN® products of the applicant contain, in addition to inorganic pigments (e.g., yellow, black, or red iron oxide pigment), dispersing agents and other auxiliary agents which promote the complete disintegration of the granules in the liquid material to be colored (e.g., liquid concrete.) These granulates are low dusting and resistant to breaking. They can easily be produced by means of spray drying and can be gravimetrically or volumetrically metered without dusting, for example, using automatic metering devices. They can easily be incorporated into the material to be colored, where they quickly disintegrate. Such products create homogenous coloring throughout, providing high color intensity and high brilliance.

These known spray granulates are suitable not only for concrete and similar building materials but also water-based coatings, paints as well as other materials to be homogenously colored throughout.

An important characteristic of pigment concentrates is the speed by which their particles disintegrate in contact with water (in particular when coloring a material), so that the pigment particles can be dispersed. In the coloring of building materials, such as concrete, as well as in paints, there is a strong demand for further reducing the mixing time necessary for homogenous coloration, because this reduces costs. Short mixing times for achieving homogeneous coloration as well as a reduction of the mechanical energy input during the blending process, would allow an improved application of the concentrate, for example, in dry mortar or ready-mixed concrete, e.g. for manual operators and at small building sites, where homogenous coloration should be achieved by manual mixing with water with a shovel, a manual mixer, or in a simple tumble mixer.

Mixing devices with low energy input and short mixing times, are also used for the production of paving stones, roof tiles and the like, so that also for such applications of the pigment concentrates, there are stringent requirements with respect to good dispersion properties.

For a long time, there has been a strong demand for pigment concentrates, whose particles, when used appropriately, disintegrate as quickly as possible when contacting the material to be colored, preferably disintegrating immediately and in such a way that the pigment particles to be dispersed are thereby essentially released.

It has been shown that the state of the art can be improved. The use of pigment concentrates according to the invention allows a homogeneous coloring of building material with very short mixing times and without applying high energy input to achieve dispersion. The use of organic disintegration agents is particularly advantageous.

In spite of the fact that previously, for example in DE 197 31 698 it has been suggested to add, among other things, disintegrating agents to the compacted granules, this suggestion has not been successful, because as of today no product is available containing such agents.

This is probably caused by the fact that the known disintegrating agents have been developed for the use in pharmaceutical applications, particularly for the quick disintegration of tablets. An auxiliary agent that can be used without problems under physiological conditions is not necessarily suitable under entirely different conditions, for example, for the production and application of spray granulates.

For example, DE 197 31 698 discloses particularly strongly hydrophilic polymers with a correspondingly large absorption capacity for water as disintegration agent, such as cellulose derivatives, dextrans, and cross-linked polyvinyl pyrrolidone (cPVP).

Most of the strongly hydrophilic cellulose derivatives are water soluble derivates with additional hydrophilic substituents, known, for example, as glues, thickening agents, and the like. Although the disintegrative effect of such cellulose derivates is considerable, other problems occur in their use, particularly because they increase the viscosity of the liquid pigment mixture prior to spray drying to such an extent that the spray drying is impeded. When used with concrete, water-soluble cellulose derivates can lead to increased blooming, which is, of course, extremely undesired. Furthermore, they increase the amount of (only very limitedly acceptable) water-soluble components and also affect the setting properties of the corresponding colored products.

Dextrans form very hard granulates; instead of a disintegrative effect, the additive causes the opposite, namely a noticeable deceleration in the disintegration of the granulate, caused by too strong adherence. Additionally, granulates produced with dextrans show a more or less marked color shift (blue shift) caused by insufficient disintegration.

The application of cross-linked PVP as a disintegrative agent in spray and compacted granulates is also less favourable.

Similar problems result from the majority of the other disintegrating agents known from prior art.

Based on this, an object of the invention is to disclose pigment concentrates, allowing a quicker dispersion than the known concentrates, while retaining at least essentially the advantages of such concentrates. Another object of the invention is to disclose such pigment concentrates, that sufficiently disintegrate during their intended use, requiring only little mechanical energy input.

Another object of the invention is to suggest respective coloring processes for materials, which were before colored according to the prior art, using the type of pigment concentrates mentioned here.

A further object of the invention is to provide an improved pigment concentrate for the coloring of building materials like for example dry mortar, ready-mixed concrete, and paving stones as well as for papers and organic materials, like mulch, where homogenous mixing without the application of high energy input is advantageous.

Last but not least, an object of the invention is the use of certain celluloses as disintegrating agents in concentrates according to the invention.

The combinations of features defined in the independent claims serve to attain one or more of these objects, in whole or in part.

BRIEF SUMMARY OF THE INVENTION

One contemplated combination is a pigment concentrate, especially for coloring cement-based building materials, such as concrete, and for coloring coatings, paints, and the like, containing at least one pigment and, in certain cases, bonding, dispersing, and wetting agents, characterized by a content of at least one disintegrating agent, which, when contacting the concentrate with water (in sufficient amount), causes an essentially complete disintegration of the primary structure of the concentrate, releasing the pigment, within one minute, without any mechanical agitation.

Another contemplated combination is a solid dispersible product, containing a filler or the like for a building material like concrete, mortar, and cement, or for water-based coatings, paints and the like, characterized by a content of disintegration agent as described above.

Still another contemplated invention is a method for coloring concrete, cement, mortar, plaster, and other such building materials, in which the building material is mixed with a pigment concentrate as described above and the pigment is dispersed by mixing in the building material. Also contemplated is the use of a cellulose product capable of exhibiting a swelling time of less than 30 seconds, preferred less than 5 seconds, after immersion in (excess) water essentially without any mechanical agitation during swelling, as a disintegrating agent in a pigment concentrate or a solid dispersible product which comprises a filler or the like for concrete, mortar and cement, or in water-based coatings, paints and the like.

Advantageous embodiments of the invention are defined in the dependent claims. Some particularly contemplated features follow.

A desirable pigment concentrate leaves, after single immersion in water according to method A as described in Experiment III, up to 75%, preferably up to 60%, more preferred up to 50% or even 40%, particularly preferred up to 21%, and most preferred not more than 16% of the original weight of the pigment granulate remaining on the sieve.

Also desirable is a pigment concentrate which leaves, after tenfold immersion in water according to method B as described in Experiment III, up to 65%, preferably up to 50%, more preferred up to 40% or even 30%, particularly preferred up to 20%, and most preferred not more than 2% of the original weight of the pigment granulate remaining on the sieve.

The disintegrating agent can be an organic compound, such as a cellulose, which can be native (fibrous) and/or spherical cellulose. An exemplary disintegrating agent comprises cellulose fibers having particle sizes (fiber lengths) from 10 μm to 2,000 μm, particularly from 10 μm to 500 μm, especially from 10 μm to 200 μm, and particularly preferred from 20 μm to 35 μm.

The disintegration agent, especially cellulose, is optionally substantially insoluble in water at 20° C. The cellulose can be partially amorphous and preferably comprises 70 wt.-% or less of crystalline material.

The concentrate can be provided with a content of a disintegrating agent of up to 10% by weight, preferably up to 5% by weight, especially by up to 3% by weight, and particularly preferred between 0.5 and 2% by weight (based on dry concentrate.)

The concentrate can be provided in the form of a spray granulate, a built-up granulate, a press granulate, an extrusion granulate, or a compacted granulate.

The concentrate can include an additional binding, dispersing and/or wetting agent, e.g., lignin sulphonate, polyalkylene glycol, propylene oxide or ethylene oxide block polymers, and/or polyacrylate.

The pigment can include at least one inorganic pigment preferably an oxide like iron oxide, cobalt oxide, titanium oxide, carbon black, or chrome oxide and/or an organic pigment.

The concentrate can have a water content of less than 10% by weight, preferably less than 5% by weight, more preferably less than 3% by weight.

A solid dispersible product is contemplated containing a filler or the like for a building material like concrete, mortar, and cement, or for water-based coatings, paints and the like, characterized by a content of disintegration agent sufficient to act as described above. An exemplary product is a dry mortar containing a pigment concentrate.

A method for coloring concrete, cement, mortar, plaster, and other such building materials is contemplated, in which the building material is mixed with a pigment concentrate as described above, and the pigment is dispersed by mixing in the building material. A similar method is contemplated for coloring water-based coatings, paints, and the like.

The use of a pigment concentrate is contemplated in dry mixtures for ready-mixed concrete, moldings thereof, paving stones, mortar, plaster, and roof tiles. The use of a pigment concentrate is contemplated for coloring mulch, paper and surface coatings as well as other organic materials.

The use is contemplated of a cellulose product capable of exhibiting a swelling time of less than 30 seconds, preferred less than 5 seconds, after immersion in (excess) water essentially without any mechanical agitation during swelling, as a disintegrating agent in a pigment concentrate or a solid dispersible product which comprises a filler or the like for concrete, mortar and cement, or in water-based coatings, paints and the like.

The cellulose product thus used can include cellulose which is substantially insoluble in water at 20° C. The cellulose product can include fibrous, at least partially amorphous cellulose. The cellulose can contain crystalline cellulose of 70% or less. The cellulose can have a particle size (fiber length) from 10 μm to 2,000 μm, alternatively 10 μm to 500 μm, alternatively from 10 μm to 2,000 μm alternatively from 20 μm to 500 μm, alternatively from 20 μm to 200 μm. It is particularly advantageous if the average particle size is in the lower range of this distribution, i.e., for example from approximately 20 μm to 50 μm, especially from 20 μm to 35 μm.

The cellulose can be used in an amount from 0.1 to 5% by weight, alternatively below 3% by weight, alternatively from 0.1% to 2% by weight, alternatively from 0.5 to 2% by weight, alternatively from 0.4% to 0.9% by weight (based on dry concentrate.)

The use of the invention is contemplated in the form of a spray granulate, a built-up granulate, a press granulate, an extrusion granulate, or a compacted granulate.

The pigment concentrate in accordance with claim 1, comprising granulates of said pigment and said disintegrating agent.

DETAILED DESCRIPTION OF THE INVENTION

Figure 1:
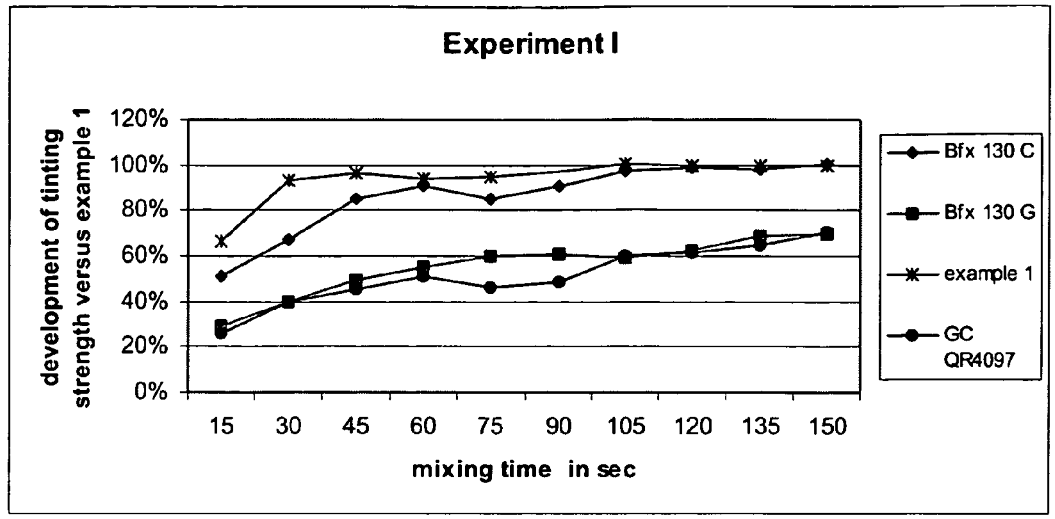
FIG. 1 shows a plot of the results obtained in Experiment I with example 1, Bayferrox® 130 C, Bayferrox® 130 G and Ferrispec™ GC QR4097.

One aspect of the invention is the use of special cellulose products for accelerating and facilitating the dispersion of pigment particles which are released by the disintegration of a pigment concentrate, especially a granulated pigment concentrate. An important function of these disintegration agents is to accelerate the disintegration of the particles of the pigment concentrate when it gets into contact with water during the coloration of a material to be colored.

Herein, the use of cellulose products has been found to be useful, even where (as in spray granulation) relatively small effects on the viscosity of the mixture, that is processed into the concentrate, can cause considerable problems.

The disintegration agents according to the invention can be used, because they exhibit, (in contrast to, for example, dextrans) reduced adherence and therefore allow dispersion more readily.

Surprisingly, the addition of the disintegration agents according to the invention does not necessarily lead to a reduction of color intensity and brilliance in the colored product.

The advantageous properties of the inventive pigment concentrates in comparison to the prior art become apparent in test procedures, in which the development of the color intensity of the pigment concentrates according to the invention is compared to pigment concentrates without the inventive disintegration agents, and to pigment concentrates known in prior art. In this pigment concentrates are tested in concrete mixtures, having a water/cement ratio suitable e.g. for ready-mixed concretes or paving stone applications. After the addition of the pigment concentrate, a sample of the mixture is taken every 15 seconds and the color intensity of the samples is measured after curing. A detailed description of the testing method is given in the embodiments examples.

The tests show that the pigment concentrates according to the invention develop higher color intensities already after very short contact with water, compared to those pigment concentrates without the inventive disintegration agent and those of the prior art.

Furthermore, the color intensity of the pigment concentrates according to the invention at the longest mixing time tested, is higher than the color intensity of the pigment concentrate without the inventive disintegration agent or those of prior art.

At the water/cement ratios typical for ready-mixed concrete applications, the difference to the prior art is especially distinctive.

It is particularly surprising that the use of specific celluloses according to the invention results in a much quicker disintegration of the concentrate when contacting water, compared to the use of other disintegrating agents. The invention allows a strongly accelerated disintegration of the particles of the concentrate (even without any mechanical agitation). Granulates according to the invention, produced by way of known processing methods, disintegrate in less than 1 minute, most often in less than 30 seconds. Even without any mechanical agitation, the original particle structure of the granulate is then no longer notable, or at least largely destroyed.

The difference to prior art is particularly notable regarding this aspect of the invention, when, on the one hand, a granulate according to the invention and, on the other hand, a comparable granulate according to prior art, but without the cellulose component according to the invention, are each combined with a sufficient amount of water (in excess). This can be observed particularly well under a microscope, when water is added drop-wise to a dry sample under the microscope in such an amount, that the probe cannot absorb any more water. On the other hand, this can also be observed macroscopically when, for example, an excess amount of water is poured over the dry concentrate provided in a beaker or the concentrate is poured into excess water.

In all of the cases mentioned, it can be observed how (without any mechanical operation) the primary structures of the granulated concentrate practically disintegrate immediately, when concentrates according to the invention are used, so that after 30 seconds, or even shorter contact times of 15 seconds, often within even less than 5 seconds contact with (sufficient) water, no unchanged granules are observed any more. With products according to prior art, this disintegration process takes much longer. Even for very good products, un-disintegrated granules can still be observed after several minutes. Granufin® from the applicant (without any disintegrating additives) can serve as a standard for reference.

For a more precise determination of the grade of disintegration of the pigment granulates according to the invention, two sieving tests were developed.

The disintegration stability of selected pigment granulates is measured by determining the weight of the granulates on a sieve before and after contact with water. During the introduction of the sieve into the water, mechanical energy input is reduced to a minimum. A comprehensive description of the test for the disintegration grade is given in the embodiment examples.

Two different methods are used for the tests:

Method A: Submerging the sieve once for 10 seconds into a water basin.

A defined amount of pigment granulates of selected size is distributed evenly on the sieve until a single layer distribution is achieved. The bottom of the sieve is submerged very cautiously 3 cm deep into a water basin, without destroying the single layer distribution and while keeping the mechanical energy input at a minimum. After 10 seconds contact with water the sieve is cautiously moved out of the water and the material remaining on the sieve is dried. The weight of the remaining material is measured.

Using the sieving test according to method A, for the pigment granulates according to the invention, up to 75%, preferably up to 60%, more preferably up to 50%, 40%, particularly preferably up to 21%, and most preferably a maximum of only 16% of the original weight of the pigment granulate remains on the sieve. Using pigment granulates without the disintegration agent according to the invention and/or those granulates known from the prior art over 80%, usually between 90% and 100%, of the original granulate remain on the sieve.

Method B: The sieve is submerged 10 times into a water basin and moved out of the water again. The contact time with water in total is 30 seconds.

A defined amount of the pigment granulate of selected size is distributed equally on the sieve until a single layer distribution is achieved. The bottom of the sieve is submerged cautiously 3 cm deep into a water basin and moved out of the water again in the same step, without destroying the single layer distribution and keeping the mechanical energy input at a minimum. The procedure is performed 10 times. The contact time with water adds up to 30 seconds in total. The sieve and the remaining material are dried in an oven and the weight of the residue is determined.

The results of the sieving test according to method B show that using the different pigment granulates according to the invention, up to 65%, preferred up to 50%, more preferred up to 40%, 30%, particularly preferred up to 20%, and most preferred a maximum of only 2% of the original weight of the pigment granulate remains on the sieve. Using pigment granulates without the disintegration agent according to the invention, and also those of the prior art, generally between 74% and 99%, and only in special cases as little as 65%, of the original granulate material remains on the sieve.

The sieving tests according to method A as well as according to method B show that for the pigment granulates according to the invention, a smaller amount of the original granulate material remains on the sieve after the contact with water, in comparison to pigment granulates without the disintegration agent according to the invention or the granulates known in the prior art, and a higher disintegration grade is achieved.

It is particularly surprising that these high disintegration grades are already achieved without any mechanical energy input by a mixer or stirrer.

When dextrans are used as disintegration agents, as suggested in prior art, little or no disintegration of the primary granulate occurs under the experimental conditions described.

Using known cellulose thickeners, which for example can be purchased from Clariant, as disintegration agents, a relatively quick disintegration is achieved, but in general, insufficiently strong color intensity and a considerable reduction of dispersion in the material to be colored is observed. Additionally, such concentrates can be spray-dried only poorly or not at all, due to the high viscosity of the spraying mixture.

A preferred aspect of the invention is the use of disintegration agents resulting in the desired disintegrating effect, without influencing the color intensity or causing deterioration of the properties of the material to be colored.

Preferred embodiments of the invention employ “technical” celluloses, which are not derivatized.

Such celluloses are commercially available, for example, as “Arbocell”® from the company J. Rettenmaier & Söhne GmbH.

Typically, such celluloses comprise natural cellulose fibers produced from wood.

In preferred embodiments these cellulose products have typical properties, such as a weight from 220 g/l to 270 g/l at a maximal moisture content of 10%. Generally suitable are particle sizes (fibre lengths) of the cellulose product from approximately 10 μm to 2,000 μm, while particle sizes (fibre lengths) from 10 μm to 500 μm, particularly preferred from 10 μm to 200 μm, have proven to be very advantageous. It is particularly advantageous if the average particle sizes (fibre lengths) are in the lower range of this distribution, i.e., for example from approximately 20 μm to 50 μm, especially from 20 μm to 35 μm.

Particularly suitable cellulose products are practically insoluble in water at 20° C.

It is preferred that the structure of the cellulose product is at least partially amorphous, and a more amorphous product is preferred. One example of such cellulose is the said Arbocell product, having a content of crystalline particles of approximately 50%.

Such celluloses are particularly preferred, if they swell practically completely in water within 30 seconds or even less, in particular, for example, within 5 seconds, and, thus, achieve the corresponding volume increase in this manner. In particular, the said partially amorphous celluloses demonstrate such short swelling times.

The crystalline portion can reach 50% here or even exceed it. For many applications, however, celluloses with less than 50% of crystalline portions are more suitable.

Preferred embodiments can contain spherical cellulose. Pure spherical cellulose, not mixed with other disintegration agents, is also suitable.

The disintegration agents can be used in amounts suitable for inorganic pigment granulates, as known from prior art (for example from DE 197 31 698 or DE 100 02 559), and surprisingly, without affecting the color intensity. Typical concentrations of such cellulose in the final product, in reference to a solid material, range from 0.1 to 5% by weight; particularly preferred amounts are below 3% by weight, in particularly from 0.5 to 2% by weight.

In many exemplary embodiments the disintegration agents according to the invention are used in combination with other components, because otherwise the content of solid matter in the slurry can become too low for spray drying. Then, preferably such bonding agents will be used that simultaneously show dispersing enhancing properties, such as polyacrylate or lignin sulfonate.

Particularly suitable for spray and compacted granulates, are pigment concentrates containing cellulose as the disintegration agent. A corresponding pigment concentrate shows a high disintegration grade in the presence of water, in the above-mentioned sieve tests. The pigment concentrates tested up to now in the form of spray or compacted granulates, which contained other disintegration agents than cellulose, did not show such high disintegration grades than those with the corresponding cellulose products. However, it is likely that there are disintegration agents and combinations of disintegration agents, that meet the sieve tests developed, e.g. in products taking a different form e.g. pellets or tablets.

If the content of solid matter in the preliminary product is of no considerable importance, the cellulose according to the invention can be used as the only additional component in addition to the pigment particles, if necessary, and then it simultaneously functions as a bonding agent and a disintegrating agent. By this, too, pigment contents can be achieved which are high enough for many purposes.

The disintegration agents according to the invention are also suitable for the use in plaster and mortar, in particular dry mortar. The disintegration agents can further be used for coloring paving stones, roof tiles, ready-mixed concrete, as well as for paper and organic materials, like mulch, and for surface-coatings. The disintegration agents according to the invention are particularly suitable for dry products, which are moistened prior to use, e.g. dry mortar, especially if the moistening is achieved by simple mixing with water. An example for the application is dry mortar for manual operators, laborers, and craftsmen who do not have access to performance mechanical mixing devices, and therefore, for example, should carry out the processing manually (with bucket and shovel) or by using a manual mixer or simple tumble mixers. Such dry products are suitable for distribution through DIY markets, building material stores and the like.

Another important field of application is the production of water-based paints and the like, for example, latex and emulsion paints and other water-based paints.

Below, the invention is explained in terms of an exemplary embodiment A, relating to a method for coloring concrete and other such building materials. This exemplary embodiment A is also valid for other pigments, other methods for the production of the pigment concentrate, and other applications of the product, i.e., the coloring of other materials.

Exemplary Embodiment A

In the exemplary embodiment A, iron oxide pigments are used. In the same fashion, for example, titanium oxide, chrome oxide, cobalt oxide, carbon black, transparent iron oxides, and other pigments can be employed.

In particular, red iron oxide pigment is processed in the exemplary embodiment A because this pigment, compared to black or yellow iron oxide pigment, most frequently causes problems in the known products, hence is the "most demanding" pigment. Additionally, in the spray granulation for red iron oxide pigment, the highest temperature is used.

Initially, the entire material, from which the pigment concentrate is to be formed, is processed together into a liquid preliminary product. For this purpose, pigment powders, as well as (where required) the content of anionic, non-ionic, and/or cationic wetting and dispersing agents, and bonding agents, and the disintegrating agent according to the invention are processed with the addition of water into a preliminary product ("slurry"). This may include a wet milling step.

In the exemplary embodiment A, the slurry is sprayed to form a granulate, and dried in a spray tower.

The overall content of additives amounts to less than 5% by weight with respect to the solid matter. The density of the slurry for the spray tower is above 2 g/cm$^3$.

The granulate produced in this manner has a residual moisture content of less than 1%.

The bulk density amounts to 1.2 to 1.3 g/cm$^3$.

The granulate is homogenously and evenly roundly shaped, and has a slight gloss. When water is added (in excess) the granulates dissolves spontaneously, the granules disintegrating entirely within 1 minute, and substantially in less than 30 seconds.

Re-dispersion in wet concrete occurs quickly and completely.

In the Vicat test, concrete shows values according to standard. No unfavorable blue shift occurred here, although an unfavorable blue shift was observed in the reference test, in which dextrans and un-cross-linked PVP were used as disintegrating agents.

The development of color intensity of the pigment granulates according to the invention was compared to those of pigment granulates without the inventive disintegration agents and those known in prior art. The tests are described in exemplary embodiment B.

Exemplary Embodiment B

First, production of pigment granulates with and without the disintegrative agents is described.

Example 1

3000 kg of iron oxide Bayferrox 130 are mixed together with 1320 kg of water, 35 kg of a polyacrylate solution, and 45 kg of Arbocell FT600/30H (company Rettenmaier) in a high-speed mixer for 10 minutes, to get a slurry with a solid content of 70%.

The slurry is dried in a spray tower to form a granulate with a moisture content of 0.5%. The inlet temperature is about 480° C. and the outlet temperature about 130° C.

Example 2

3000 kg of iron oxide red Bayferrox 130 are mixed together with 1320 kg of water and 80 kg of polyacrylate solution in a high speed mixer for 10 minutes, to get a slurry with a solid content of 70%.

The slurry is dried in a spray tower to form a granulate with a moisture content of 0.6%. The inlet temperature is about 490° C. and the outlet temperature about 130° C.

Example 3

6000 kg of iron oxide red Ferroxide 212 are mixed together with 2600 kg of water, 75 kg of a polyacrylate solution, and 110 kg Arbocell FT 600/30H (company Rettenmaier) in a high speed mixer for 10 minutes, to get a slurry with a solid content of 70%.

The slurry is dried in a spray tower to a granulate with a moisture content of 0.35%. The inlet temperature is about 445° C. and the outlet temperature about 126° C.

Example 4

3000 kg of iron oxide red Ferroxide 212 are mixed together with 1540 kg of water, and 80 kg of a polyacrylate solution in a high speed mixer for 10 minutes, to get a slurry with a solid content of 66%.

The slurry is dried in a spray tower to a granulate with a moisture content of 0.6%. The inlet temperature is about 450° C. and the outlet temperature 130° C.

Example 5

6000 kg of iron oxide black Ferroxide 77 are mixed together with 2100 kg of water, 60 kg a polyacrylate solution, and 80 kg of Arbocell FT600/30H (company Rettenmaier) in a high speed mixer for 10 minutes, to get a slurry with a solid content of 58%.

The slurry is dried in a spry tower to a granulate with a moisture content of 0.66%. The inlet temperature is about 400° C. and the outlet temperature about 130° C.

Example 6

2000 kg of iron oxide black Ferroxide 77 are mixed together with 1370 kg of water, and 80 kg of a polyacrylate solution, in a high speed mixer for 10 minutes to get a slurry with a solid content of 59%.

The slurry is dried in a spray tower to a granulate with a moisture content of 0.7%. The inlet temperature is about 400° C. and the outlet temperature about 130° C.

The coloring tests with the pigment granulates are conducted at two application-relevant water/cement ratios. In Experiment I, a water/cement ratio of 0.39 is used, which is typical for paving stone applications. In Experiment II, the water/cement ratio is 0.66, which is typical e.g. for ready-mixed applications.

Some (single) data points for the determination of the color intensity of the example 1 to 6 are not shown in the figures, as they are believed to be influenced by curing or measurement artifacts. The complete data of the measurements are however listed in the corresponding tables.

Experiment I: Water/Cement Ratio of.

In the examples, the color intensity of the pigment granulates according to the invention is measured relative to pigments granulates without disintegration agents and those known from prior art.

1350 g of sand are mixed with 50 g of water for 2 minutes in a Hobard mixer N50/3-1 at speed level 1, to form a homogenous mixture. 350 g of white cement (42.5 CEMI) are added to the mix and stirred for another 1 minute. Then 3% of red or black pigment, based on the cement content, and 86.5 g of water are added.

The following pigments were used:

In example 1: red pigment Bayferrox® 130, a synthetic Iron oxide $\alpha$-$Fe_2O_3$ from Bayer AG In example 2: red pigment Bayferrox® 130, a synthetic Iron oxide $\alpha$-$Fe_2O_3$ from Bayer AG In example 3: red pigment Ferroxide 212, an Iron oxide $Fe_2O_3$ from Silo In example 4: red pigment Ferroxide 212, an Iron oxide $Fe_2O_3$ from Silo In example 5: black pigment Ferroxide 77, an Iron oxide $Fe_3O_4$ from Silo In example 6: black pigment Ferroxide 77, an Iron oxide $Fe_3O_4$ from Silo For comparison with prior art, the following pigments were used:

Red pigment Bayferrox® 130 C (compact pigment), a synthetic Iron oxide $\alpha$-$Fe_2O_3$ from Bayer AG.

Red pigment Bayferrox® 130 G (micro granulate), a synthetic Iron oxide $\alpha$-$Fe_2O_3$ from Bayer AG.

Red pigment Bayferrox® 110 C (compact pigment), a synthetic Iron oxide $\alpha$-$Fe_2O_3$ from Bayer AG.

Red pigment Bayferrox® 110 G (micro granulate), a synthetic Iron oxide $\alpha$-$Fe_2O_3$ from Bayer AG.

Black pigment Bayferrox® 330 G (Micro granulate), a synthetic Iron oxide $Fe_3O_4$ from Bayer AG.

Black pigment Bayferrox® 330 C (Micro granulate), a synthetic Iron oxide $Fe_3O_4$ from Bayer AG.

Red pigment Ferrispec™ GC QR 4097, an Iron oxide $Fe_2O_3$ from Elementis.

Red pigment Ferrispec™ GC QR 2199, an Iron oxide $Fe_2O_3$ from Elementis.

Black pigment Ferrispec™ GC QR 5799, an Iron oxide $Fe_3O_4$ from Elementis.

After each 15 seconds of mixing period, 175 g of the mixture are compacted in a mold to form a chip. The chips are cured at 40° C. temperature overnight and measured for color data.

Figure 2:
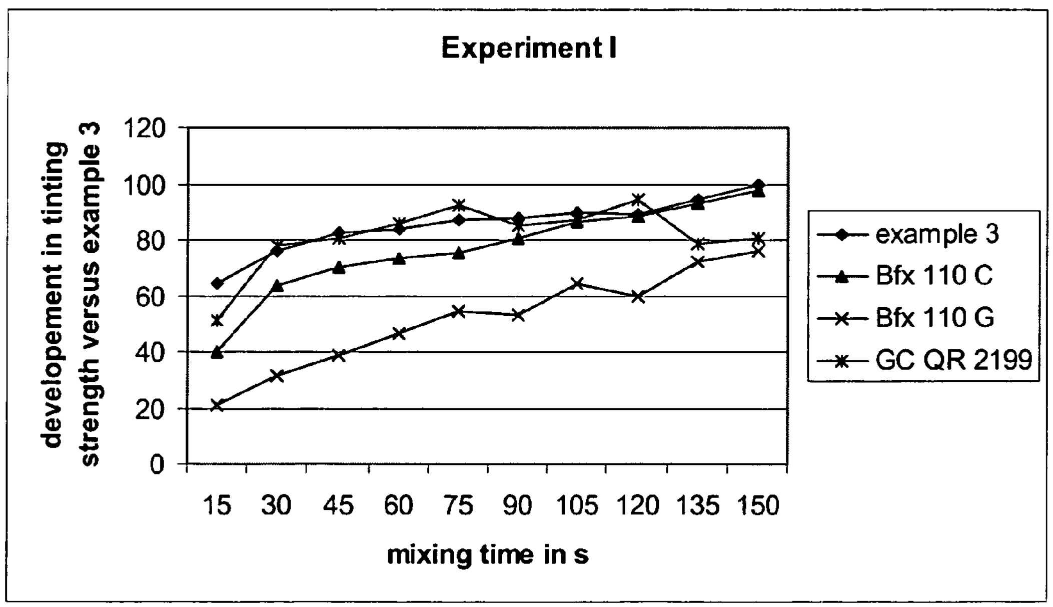
FIG. 2 shows a plot of the results obtained in Experiment I with example 3, Bayferrox® 110 C, Bayferrox® 110 G and Ferrispec™ GC QR2199.
Figure 3:
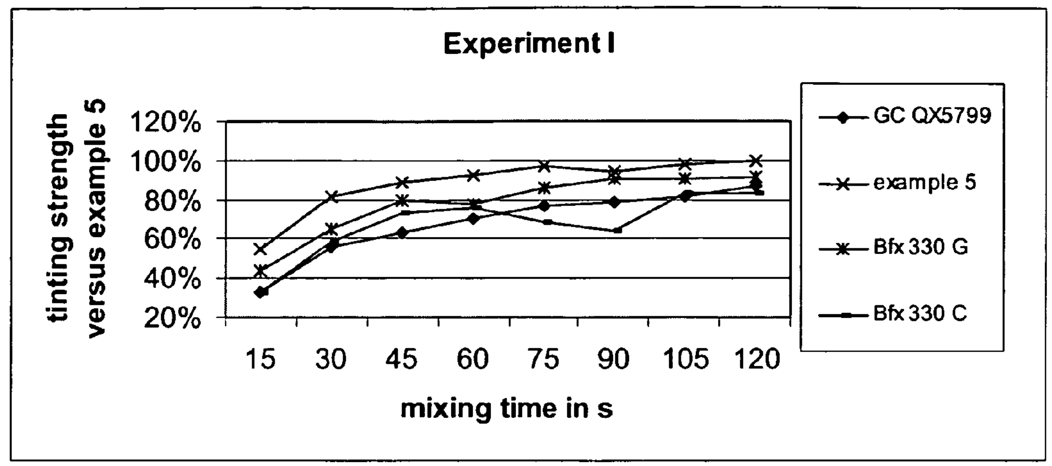
FIG. 3 shows a plot of the results obtained in Experiment I with example 5, Bayferrox® 330 C, Bayferrox® 330 G and Ferrispec™ GC QX5799.

Experiment I:

Below, the results of the experiment I are shown in FIGS. 1 to 3, in which the color intensity of each stone is compared to that of the stone with the pigment according to the invention, with the longest mixing time tested.

In the FIGS. 1-3, it is clearly notable, that the pigment granulates according to the invention, represented by examples 1, 3, and 5, show a quicker development of color intensity, especially in the early mixing phase, than those granulates known from prior art.

Figure 4:
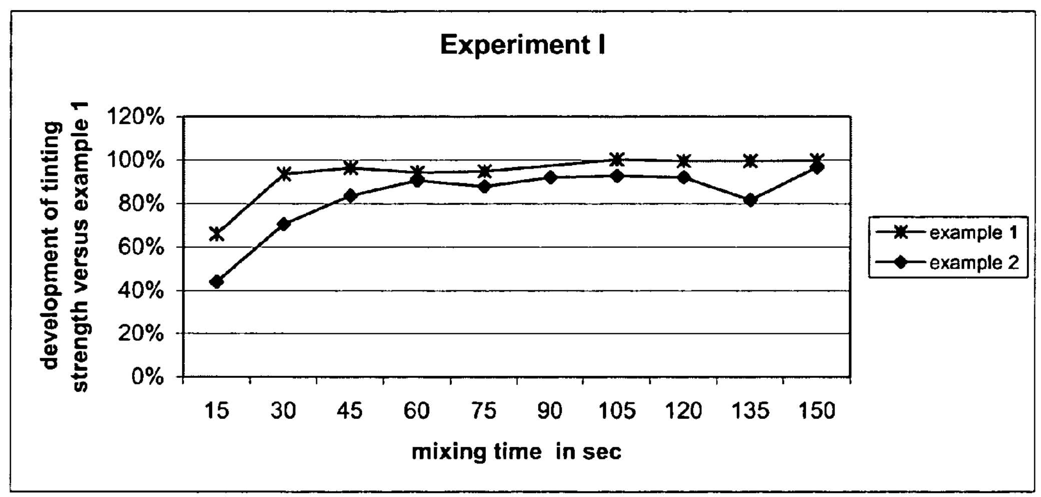
FIG. 4 shows a plot of the results obtained in Experiment I with examples 1 and 2.
Figure 5:
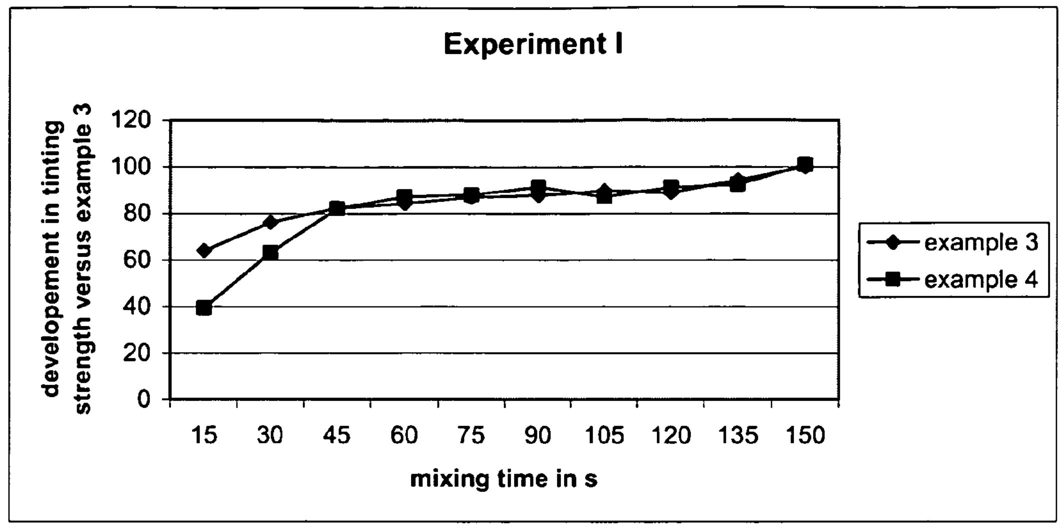
FIG. 5 shows a plot of the results obtained in Experiment I with examples 3 and 4.
Figure 6:
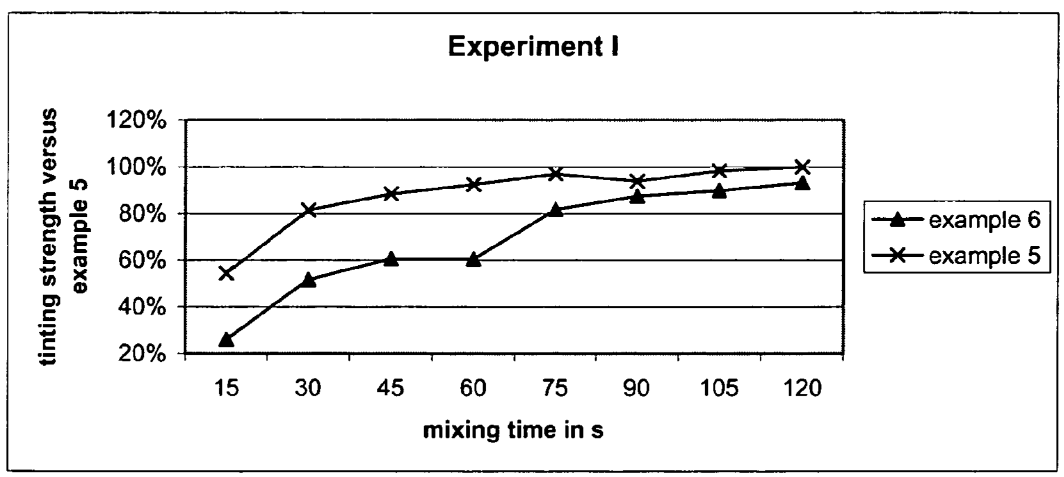
FIG. 6 shows a plot of the results obtained in Experiment I with examples 5 and 6.

The comparison of examples 1, 3, and 5, (with the inventive disintegration agent) and the examples 2, 4, and 6, (without the inventive disintegration agent) is shown in FIGS. 4-6.

It is clearly shown in FIGS. 4 to 6, that the pigment concentrates according to the invention (example 1, 3 and 5) show a faster development of color intensity and generally a higher color intensity at the longest mixing time tested, than those without the inventive disintegration agent.

Experiment I shows that the pigment granulates according to the invention differ from those known from prior art, in the development of color intensity and in the color intensity achieved at the longest mixing time tested.

The complete data of Experiment I for examples 1 and 2 as well as for the corresponding prior art is summarized in Table 1.

TABLE 1

Complete data for example 1 and 2 as well as for Bayferrox ® 130 C, Bayferrox ® 130 G and Ferrispec ™ GC QR4097.

| Mixing time in s | Example 1 | Example 2 | Bfx 130 C | Bfx 130 G | GC QR 4097 |
|---|---|---|---|---|---|
| 15 | 66% | 44% | 51% | 29% | 26% |
| 30 | 94% | 71% | 67% | 40% | 40% |
| 45 | 96% | 84% | 85% | 49% | 45% |
| 60 | 94% | 91% | 91% | 55% | 51% |
| 75 | 95% | 88% | 85% | 60% | 46% |
| 90 | 80% | 92% | 91% | 61% | 49% |
| 105 | 100% | 93% | 98% | 59% | 60% |
| 120 | 100% | 92% | 99% | 62% | 62% |
| 135 | 100% | 82% | 98% | 69% | 65% |
| 150 | 100% | 97% | 100% | 70% | 71% |

The complete data of Experiment I for examples 3 and 4 as well as for the corresponding prior art is summarized in Table 2.

TABLE 2

Complete data for example 3 and 4 as well as for Bayferrox ® 110 G, Bayferrox ® 110 und Ferrispec ™ GC QR2199.

| Mixing time in s | Example 3 | Example 4 | Bfx 110 C | Bfx 110 G | GC QR2199 |
|---|---|---|---|---|---|
| 15 | 64% | 40% | 40% | 21% | 51% |
| 30 | 76% | 63% | 64% | 31% | 78% |
| 45 | 82% | 82% | 70% | 39% | 81% |
| 60 | 84% | 87% | 74% | 47% | 86% |
| 75 | 87% | 88% | 76% | 54% | 92% |
| 90 | 88% | 91% | 81% | 53% | 85% |
| 105 | 90% | 87% | 86% | 64% | 87% |
| 120 | 89% | 91% | 88% | 60% | 94% |
| 135 | 94% | 92% | 93% | 72% | 79% |
| 150 | 100% | 101% | 98% | 76% | 81% |

The complete data of Experiment I for examples 5 and 6 as well as for the corresponding prior art is summarized in Table 3.

TABLE 3

Complete data for example 5 and 6 as well as for Bayferrox ® 330 C, Bayferrox ® 330 G und Ferrispec ™ GC QX5799.

| Mixing time in s | Example 5 | Example 6 | Bfx 330 G | Bfx 330 C | GC QX5799 |
|---|---|---|---|---|---|
| 15 | 54% | 26% | 44% | 33% | 33% |
| 30 | 81% | 52% | 65% | 59% | 56% |
| 45 | 88% | 61% | 79% | 73% | 63% |
| 60 | 92% | 61% | 77% | 76% | 70% |
| 75 | 97% | 82% | 86% | 68% | 77% |
| 90 | 94% | 87% | 91% | 64% | 78% |
| 105 | 98% | 90% | 90% | 83% | 82% |
| 120 | 100% | 93% | 92% | 83% | 87% |

Experiment II:

In this experiment, the color intensity of pigment granulates according to the invention is tested compared to those without the inventive disintegration agent and those known from prior art, at a water/cement ratio of 0.66, which is typical for ready-mixes.

350 g of concrete sand (500 μm to 2000 μm), 150 g white silica sand (<500 μm), 75 g of white Portland cement, and 3% (2.25 g) of the pigment, based on the cement content, are placed in a mixing bowl (Hobard mixer N 50/3-1) and mixed with 50 g of water for 30 seconds at speed level 1.

The following pigments were used:

In example 1: red pigment Bayferrox® 130, a synthetic Iron oxide α-$Fe_2O_3$ from Bayer AG.

In example 2: red pigment Bayferrox® 130, a synthetic Iron oxide α-$Fe_2O_3$ from Bayer AG.

In example 3: red pigment Ferroxide 212, an Iron oxide Fe2O3 from Silo

In example 4: red pigment Ferroxide 212, an Iron oxide Fe2O3 from Silo

In example 5: black pigment Ferroxide 77, an Iron oxide $Fe_3O_4$ from Silo

In example 6: black pigment Ferroxide 77, an Iron oxide $Fe_3O_4$ from Silo

For comparison with prior art, the following pigments have been used:

Red pigment Bayferrox® 130 C (compact pigment), a synthetic Iron oxide α-$Fe_2O_3$ from Bayer AG.

Red pigment Bayferrox® 130 G (micro granulate), a synthetic Iron oxide α-$Fe_2O_3$ from Bayer AG.

Red pigment Bayferrox® 110 C (compact pigment), a synthetic Iron oxide α-$Fe_2O_3$ from Bayer AG.

Red pigment Bayferrox® 110 G (micro granulate), a synthetic Iron oxide α-$Fe_2O_3$ from Bayer AG.

Black pigment Bayferrox® 330 G (Micro granulate), a synthetic Iron oxide $Fe_3O_4$ from Bayer AG.

Black pigment Bayferrox® 330 C (Micro granulate), a synthetic Iron oxide $Fe_3O_4$ from Bayer AG.

Red pigment Ferrispec™ GC QR 4097, an Iron oxide $Fe_2O_3$ from Elementis.

Red pigment Ferrispec™ GC QR 2199, an Iron oxide $Fe_2O_3$ from Elementis.

Black pigment Ferrispec™ GC QR 5799, an Iron oxide $Fe_3O_4$ from Elementis.

After each 15 seconds mixing period, 25 g of the mixture are compacted in a mold to form a chip. The chips are cured at room temperature overnight and measured for color data.

Figure 7:
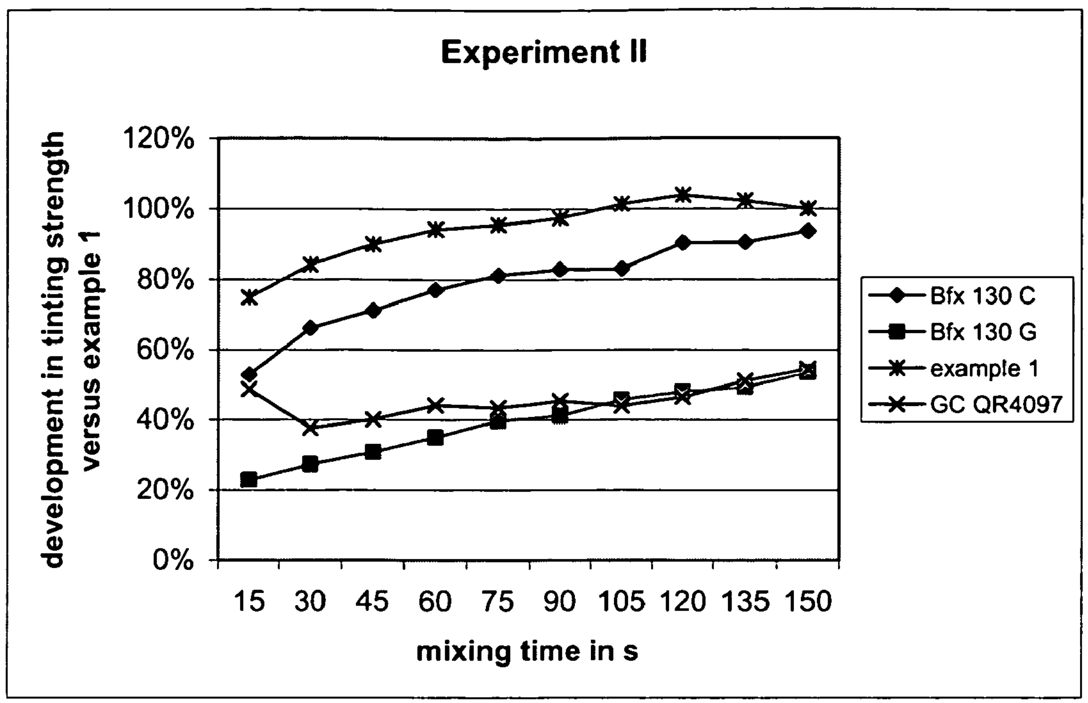
FIG. 7 shows a plot of the results obtained in Experiment II with example 1, Bayferrox® 130 C, Bayferrox® 130 G and Ferrispec™ GC QR4097.
Figure 8:
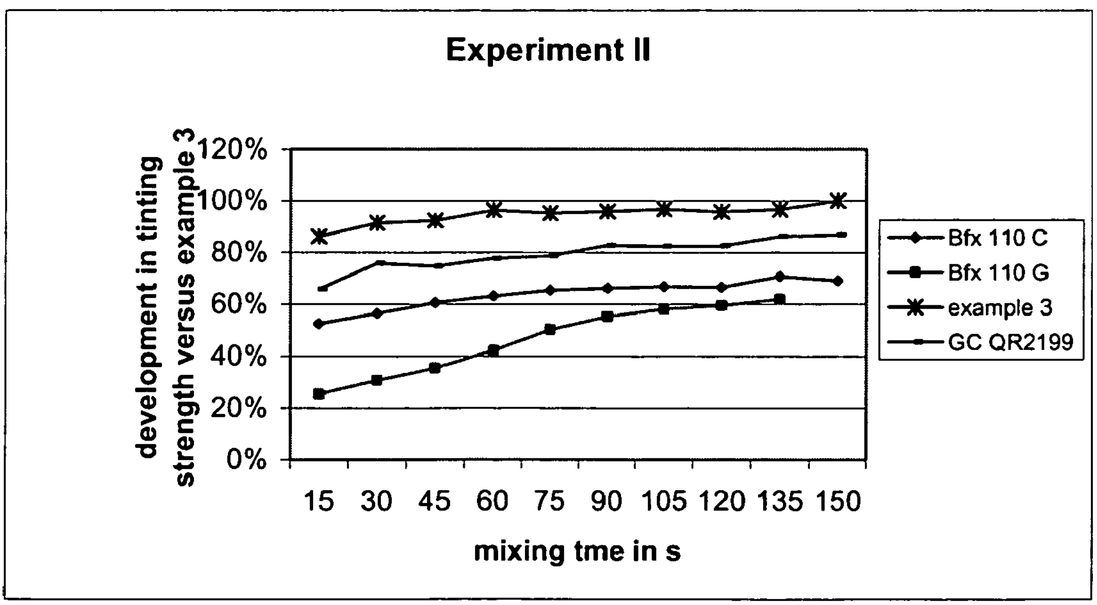
FIG. 8 shows a plot of the results obtained in Experiment II with example 3, Bayferrox® 110 C, Bayferrox® 110 G und Ferrispec™ GC QR2199.
Figure 9:
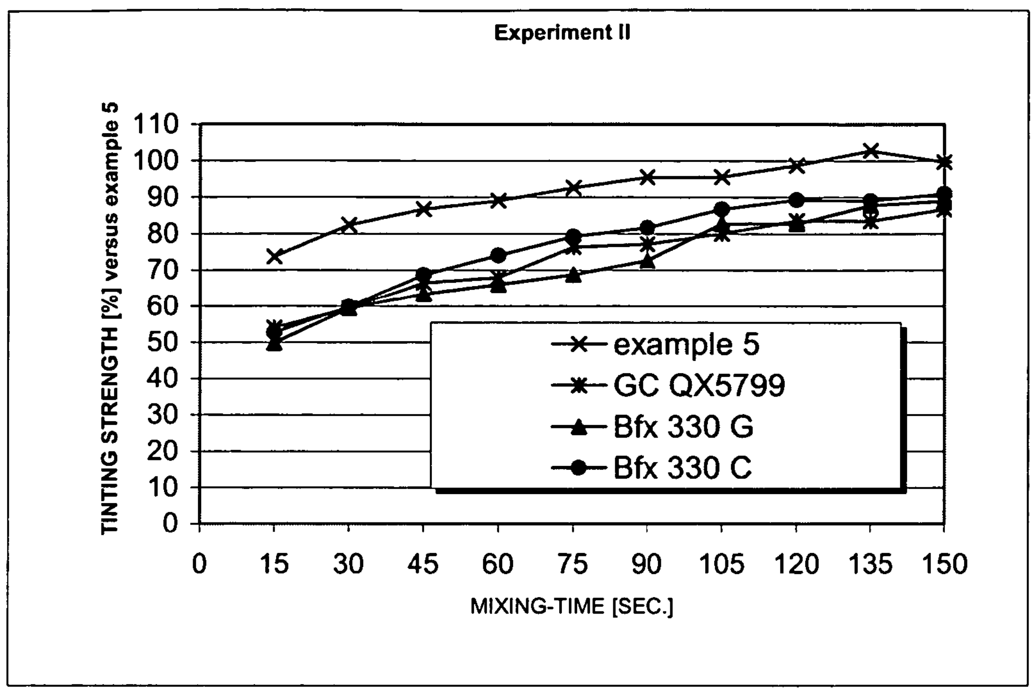
FIG. 9 shows a plot of the results obtained in Experiment II with example 5, Bayferrox® 330 C, Bayferrox® 330 G und Ferrispec™ GC QX5799.

In the following, the results of experiment II are shown in FIGS. 7 to 9, in which the color intensity of each stone is compared to that of the stone with the inventive disintegration agent with the longest mixing time tested.

Experiment II shows that the pigment granulates according to the invention show a faster development of color intensity than those known from prior art. Examples 1, 3, and 5 show in addition, a higher color intensity at the longest mixing time tested, than the pigment granulates known from prior art.

Figure 10:
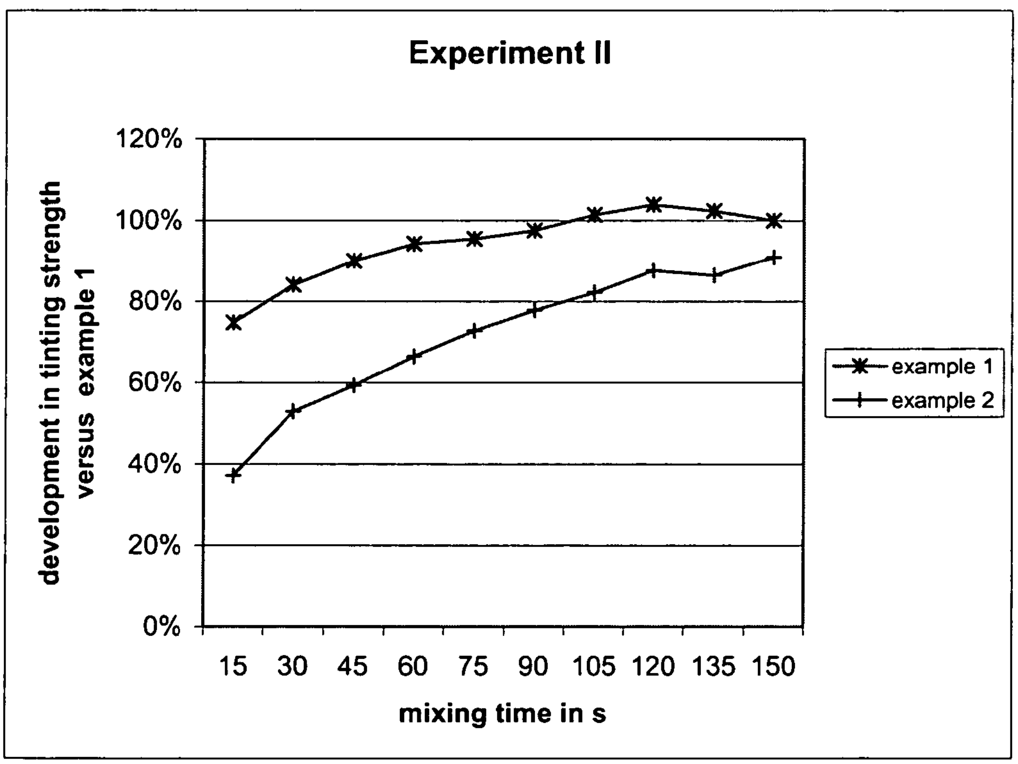
FIG. 10 shows a plot of the results obtained in Experiment II with example 1 and example 2.
Figure 11:
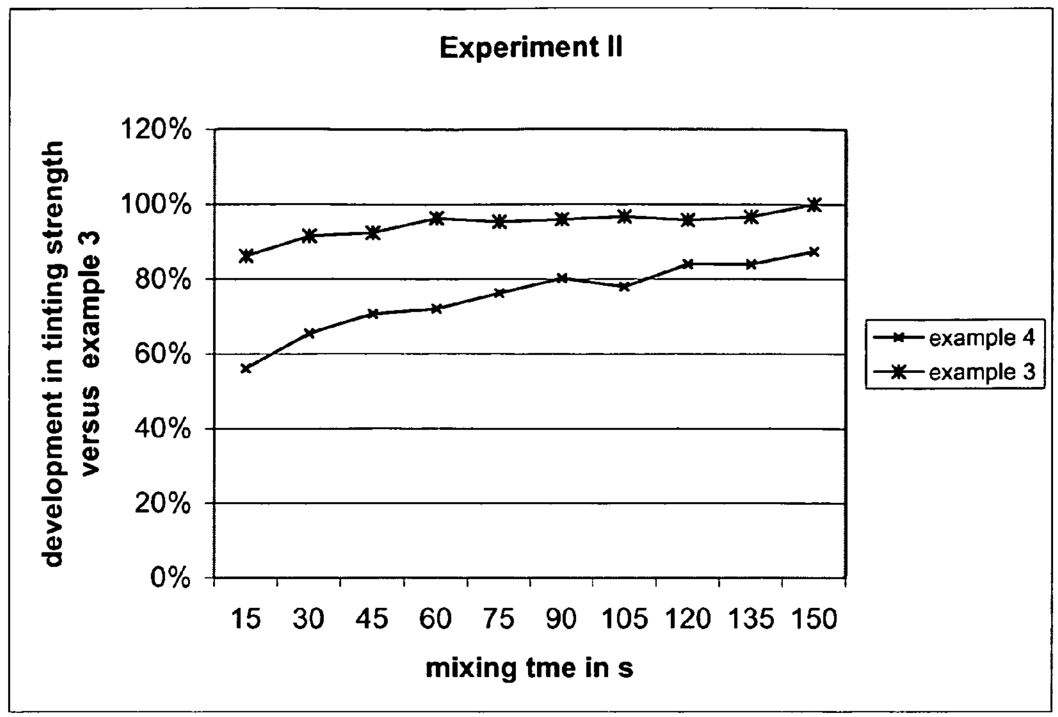
FIG. 11 shows a plot of the results obtained in Experiment II with example 3 and example 4.
Figure 12:
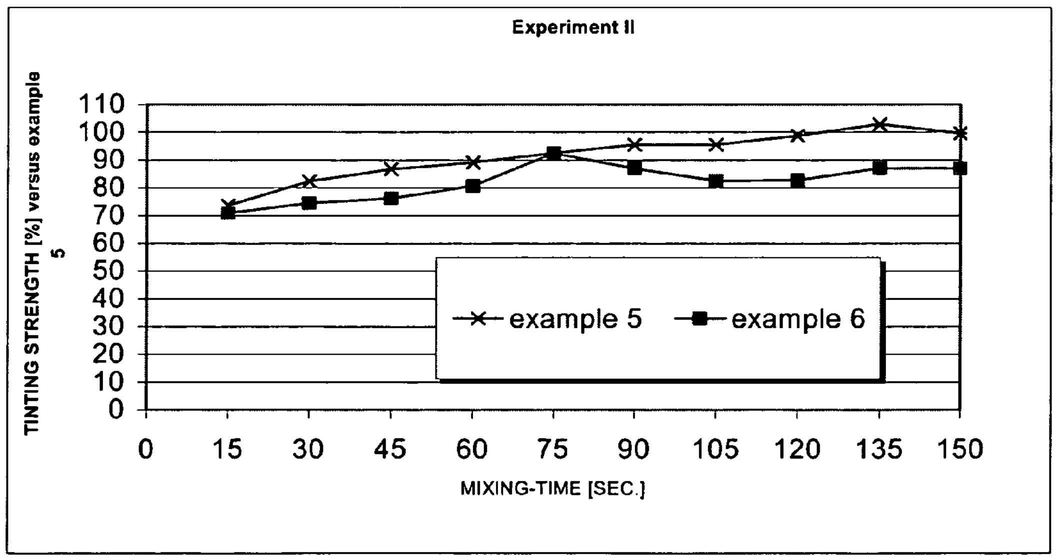
FIG. 12 shows a plot of the results obtained in Experiment II with example 5 and example 6.

The results of experiment II (examples 1, 3, and 5) compared with examples 2, 4, and 6, (without inventive disintegration agent), are shown in FIGS. 10 to 12.

The pigment granulates with the inventive disintegration agents show a higher color intensity already at the beginning of the mixing period, as well as a higher color intensity at the longest mixing time tested, than those without the inventive disintegration agent.

The experiments I and II show that the pigment granulates according to the invention provide faster development of color intensity as well as higher color intensity achieved at the longest mixing time tested, compared to those without the inventive disintegration agent or those known from prior art. These advantages of the inventive pigment granulates are found at both water/cement ratios tested.

These advantages are particularly apparent for the water/cement ratio of 0.66, which is typical for ready-mixes.

The complete data of Experiment II for examples 1 and 2 as well as for the corresponding prior art is summarized in Table 4.

TABLE 4

Complete data for example 1 and 2 as well as for Bayferrox ® 130 C, Bayferrox ® 130 G and Ferrispec ™ GC QR4097

| Mixing time in s | Example 1 | Example 2 | Bfx 130 C | Bfx 130 G | GC QR4097 |
|---|---|---|---|---|---|
| 15 | 75% | 37% | 53% | 23% | 49% |
| 30 | 84% | 53% | 66% | 27% | 38% |
| 45 | 90% | 59% | 71% | 31% | 40% |
| 60 | 94% | 67% | 77% | 35% | 44% |
| 75 | 96% | 73% | 81% | 40% | 43% |
| 90 | 98% | 78% | 83% | 41% | 45% |
| 105 | 101% | 82% | 83% | 46% | 44% |
| 120 | 104% | 88% | 90% | 48% | 47% |
| 135 | 102% | 86% | 91% | 49% | 51% |
| 150 | 100% | 91% | 94% | 54% | 55% |

The complete data of the Experiment II for examples 3 and 4 as well as for the corresponding prior art is summarized in Table 5.

TABLE 5

Complete data for example 3 and 4 as well as for Bayferrox ® 110 C, Bayferrox ® 110 G and Ferrispec ™ GC QR2199.

| Mixing time in s | Example 3 | Example 4 | Bfx 110 C | Bfx 110 G | GC QR2199 |
|---|---|---|---|---|---|
| 15 | 86% | 56% | 53% | 25% | 66% |
| 30 | 91% | 65% | 57% | 31% | 76% |
| 45 | 92% | 71% | 61% | 35% | 75% |
| 60 | 96% | 72% | 63% | 42% | 78% |
| 75 | 95% | 76% | 65% | 50% | 79% |
| 90 | 96% | 80% | 66% | 55% | 83% |
| 105 | 97% | 78% | 67% | 58% | 82% |
| 120 | 96% | 84% | 67% | 59% | 83% |
| 135 | 97% | 84% | 71% | 62% | 86% |
| 150 | 100% | 87% | 69% | | 87% |

The complete data of Experiment II for examples 5 and 6 as well as for the corresponding prior art is summarized in Table 6.

TABLE 6

Complete data for example 3 and 4 as well as for Bayferrox ® 330 C, Bayferrox ® 330 G und Ferrispec ™ GC QX5799.

| Mixing time in s | Example 5 | Example 6 | Bfx 330 C | Bfx 330 G | GC QX5799 |
|---|---|---|---|---|---|
| 15 | 74% | 71% | 53% | 50% | 54% |
| 30 | 82% | 74% | 60% | 59% | 59% |
| 45 | 87% | 76% | 69% | 63% | 66% |
| 60 | 89% | 81% | 74% | 66% | 68% |
| 75 | 93% | 92% | 79% | 69% | 76% |
| 90 | 96% | 87% | 82% | 73% | 77% |
| 105 | 96% | 83% | 87% | 83% | 80% |
| 120 | 99% | 83% | 89% | 83% | 84% |
| 135 | 103% | 87% | 89% | 88% | 83% |
| 150 | 100% | 87% | 91% | 89% | 87% |

Experiment IIa: Compacting Tests

The iron oxide pigment Bayferrox 130 was mildly compacted and then processed into a granulate with a grain size between 0 and 1 mm. Different mixtures of iron oxide pigment and disintegration agents were tested.

Example A

Bayferrox 130 was selected as the iron oxide pigment and 2.5% by weight (based on the iron oxide pigment) of native cellulose (native cellulose, Rettenmaier) was used as the disintegration agent.

Example B

Bayferrox 130 was used as the iron oxide pigment and 2.5% by weight (based on the iron oxide pigment) of spherical cellulose (spherical cellulose, Mixrocell 102, Blanver Framoquimicia LTDA) was used as the disintegration agent.

Example C

Bayferrox 130 was used as the iron oxide pigment and 2.5% by weight (based on the iron oxide pigment) of native cellulose (cellulose Lattice NT 013, FMC) was used as the disintegration agent.

Example F

Only Bayferrox 130 was used, without any further addition of disintegration agent. This sample can be regarded as a reference.

Example G

Bayferrox 130 was used as the iron oxide pigment and 2.5% by weight (based on the iron oxide pigment) of native cellulose (native cellulose, Rettenmaier) was used as the disintegration agent; besides, 2.5 weight % polypropylene glycol ether was added.

The experiments were performed on a "Kompaktor CS 25" with hydraulically supported rollers. Rollers with a 12 mm closed corrugated profile ("Wellprofil") were installed. The maximum press capacity was determined from the hydralic pressure. The resulting ribbons were milled into pieces smaller than 1 mm with a mill "FC 100".

Example A: The specific compaction force is 12 kN/cm; the resulting bulk weight is 1204 g/l.

Example B: The specific compaction force amounts to 12 kN/cm; the resulting bulk weight is 1102 g/l.

Example C: The specific compaction force amounts to 12 kN/cm; the resulting bulk weight is 1136 g/l.

Example F: The specific compaction force amounts to 12 kN/cm; the resulting bulk weight is 1232 g/l.

Example G: The specific compaction force amounts to 12 kN/cm; the resulting bulk weight is 1198 g/l.

All particles smaller than 250 μm were separated by sieving with a 250 μmesh sieve.

Figure 13:
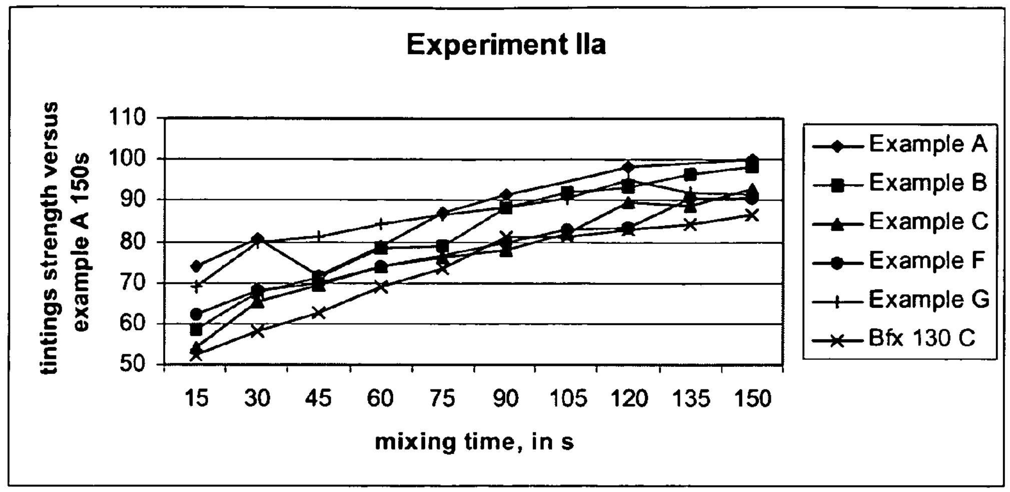
FIG. 13 shows a plot of the results obtained in Development of color intensity of examples A, B, C, F, G and Bayferrox® 130 C.

The results of the development in color strength for examples A, B, C, F, and G and one example of the prior art, Bayferrox® 130 C, are shown in FIG. 13.

FIG. 13 shows that examples A (native cellulose), B (spherical cellulose) and G (native cellulose and polypropylene glycol ether) show faster development in color intensity than example F, without the disintegration agent according to the invention, and comparative example Bayferrox® 130 C. The color intensity for examples A, B, C, and G (for the longest mixing time tested) is higher than the color intensity of example F without the inventive disintegration agent, and the comparative example Bayferrox® 130 C.

The complete data of Experiment IIa for examples A, B, C, F, and G as well as for the comparative example Bayferrox® 130 C is summarized in Table 7.

TABLE 7

Complete data for examples A, B, C, F, G und Bayferrox ® 130 C.

| Mixing time in s | Example A | Example B | Example C | Example F | Example G | Bfx 130 C |
|---|---|---|---|---|---|---|
| 15 | 74% | 59% | 54% | 62% | 69% | 52% |
| 30 | 81% | 68% | 65% | 68% | 80% | 58% |
| 45 | 72% | 71% | 69% | 70% | 81% | 63% |
| 60 | 79% | 78% | 74% | 74% | 84% | 69% |
| 75 | 87% | 79% | 76% | 70% | 87% | 73% |
| 90 | 91% | 88% | 78% | 80% | 80% | 81% |
| 105 | 85% | 92% | 82% | 83% | 91% | 81% |
| 120 | 98% | 93% | 90% | 84% | 95% | 83% |
| 135 | 93% | 97% | 89% | 91% | 92% | 84% |
| 150 | 100% | 98% | 93% | 91% | 91% | 87% |

Experiment III:

An essential parameter for the pigment granulates is their disintegration stability at contact with water. To measure the disintegration stability, sieve tests were performed.

Two sieve tests at different water contact times and submersion procedures were conducted.

Method A: Submerging the sieve once with pigment granulate for 10 seconds in a water basin About 10 g of the pigment granulate of the selected size (bigger than 200 μm) are distributed on a sieve (type Analysette 3 pro, diameter 21 cm, company Fritsch) with a 200 μm mesh so that a single layer distribution is obtained. The bottom of the sieve is submerged cautiously 3 cm deep into a water basin, without destroying the equal distribution of the pigment granulates, to reduce the mechanical energy input to a minimum. The sieve is kept in the water basin for 10 seconds (with the granulate covered by water) and than is cautiously moved out of the water. The remaining material on the sieve is dried in an oven at 100° C. and the weight of the residue is measured.

Method B: The sieve is submerged 10 times into a water basin and moved out in the same step. The contact time with water is 30 seconds in total.

10 g of the pigment granulate of the selected size (bigger than 200 μm) are equally distributed on a sieve (Type Analysette 3 pro, diameter 21 cm, company Fritsch) with a 200 μm mesh so that a single layer distribution is achieved. The bottom of the sieve is very cautiously submerged 3 cm deep into a water basin (so that the granulate is covered by water), without destroying the equal distribution of the pigment granulates, to reduce the mechanical energy input to a minimum, and the sieve is cautiously moved out of the water in the same step. The contact time with water is 30 seconds in total. The remaining material is dried in an oven at 100° C. and the weight of the residue is measured.

Figure 14:
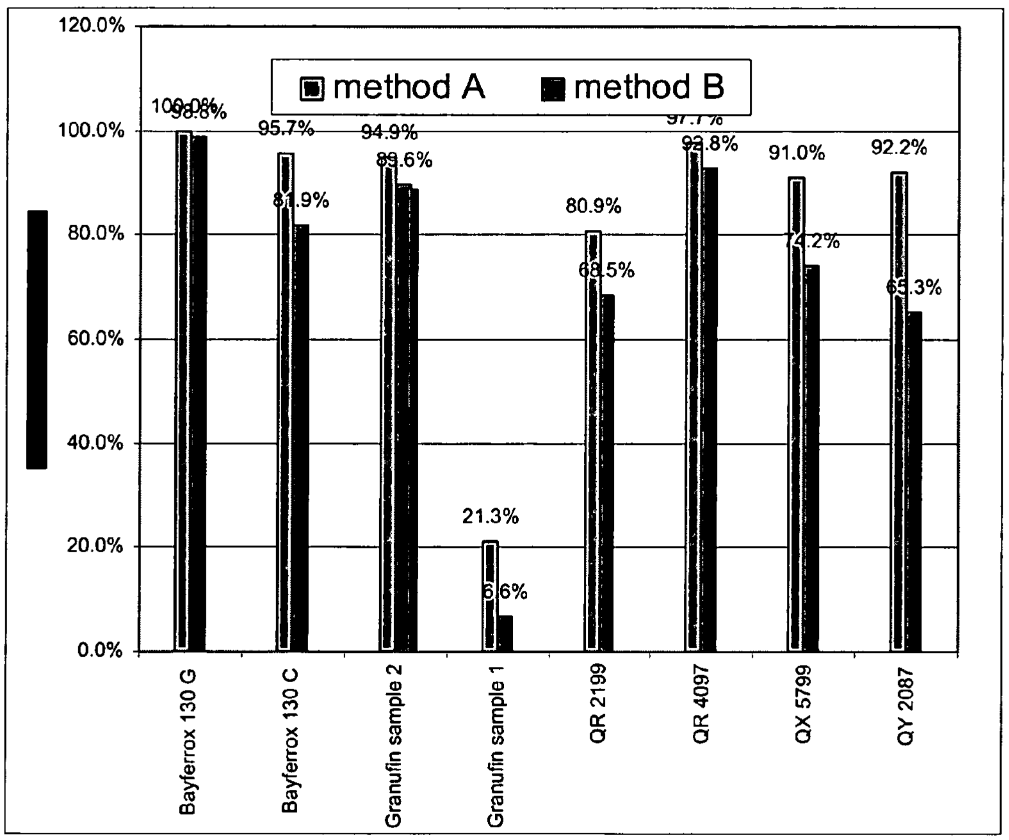
FIG. 14 shows a plot of the results obtained in Results of the sieve tests for the examples 1 and 2 and prior art according to method A and method B.

The results of the sieve test of examples 1 and 2 and the prior art according to method A and method B are shown in FIG. 14.

The sieve tests show that example 1 with the disintegration agent according to the invention, differs clearly from example 2 without the inventive disintegration agent and from the prior art. While according to method A for example 1. 21% of the original pigment concentrate remains on the sieve, between 81% and 100% of the original granulate are found to remain on the sieve for the respective comparative examples and the example without the disintegration agent according to the invention.

In disintegration experiments according to method B for example 1.7% of the original pigment concentrate remains on the sieve as residue, while for example 2 (without the disintegration agent according to the invention), 90%, and for the pigment concentrates known from prior art between 65% and 99% of the granulate remain on the sieve.

Figure 15:
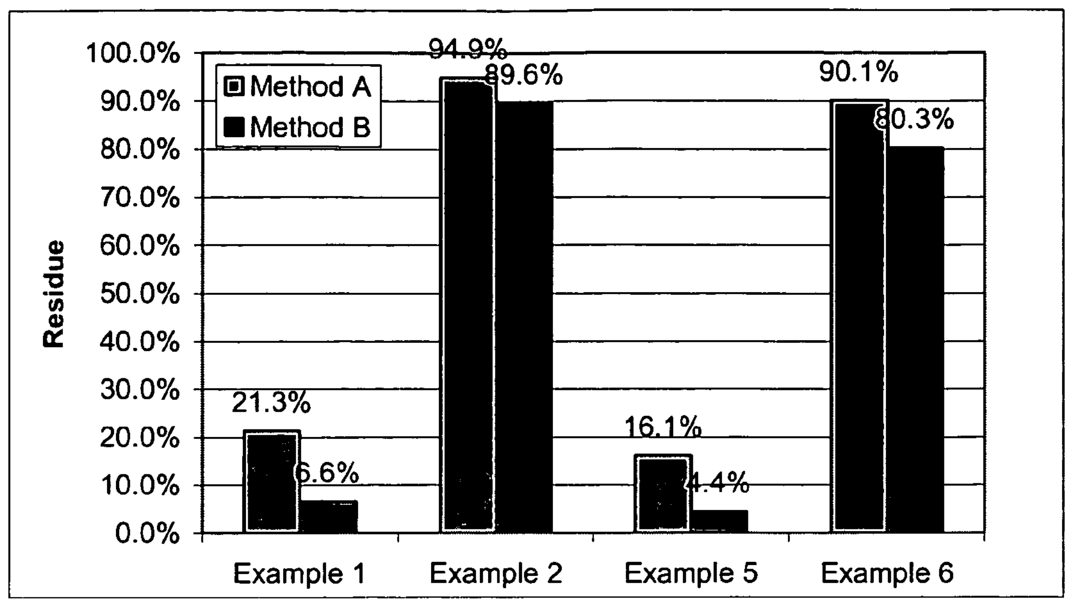
FIG. 15 shows a plot of the results obtained in Sieving test results of the examples 1, 2, 5 and 6 according to the methods A and B.

The results of the sieving tests for examples 1, 2, 5, and 6 according to method A and method B are shown in FIG. 15.

The comparison of examples 1 and 5 (with the inventive disintegration agent) with examples 2 and 6 (without the inventive disintegration agent) reveal a clear influence of the disintegration agent on the disintegration grade of the pigment concentrate. While for example 1 according to method A, 21%, and according to method B, 7%, of the original pigment concentrate remain on the sieve, the residue of example 2 amounts to 95% according to method A, and 90% according to method B, respectively. Similar results are obtained for examples 5 and 6. In the sieve tests according to method A for example 5, a residue of 16%, and according to method B, a residue of 4% remains on the sieve, while for example 6 (without the disintegration agent according to the invention), 90% and 80% respectively of the original pigment concentrate remain on the sieve.

Figure 16:
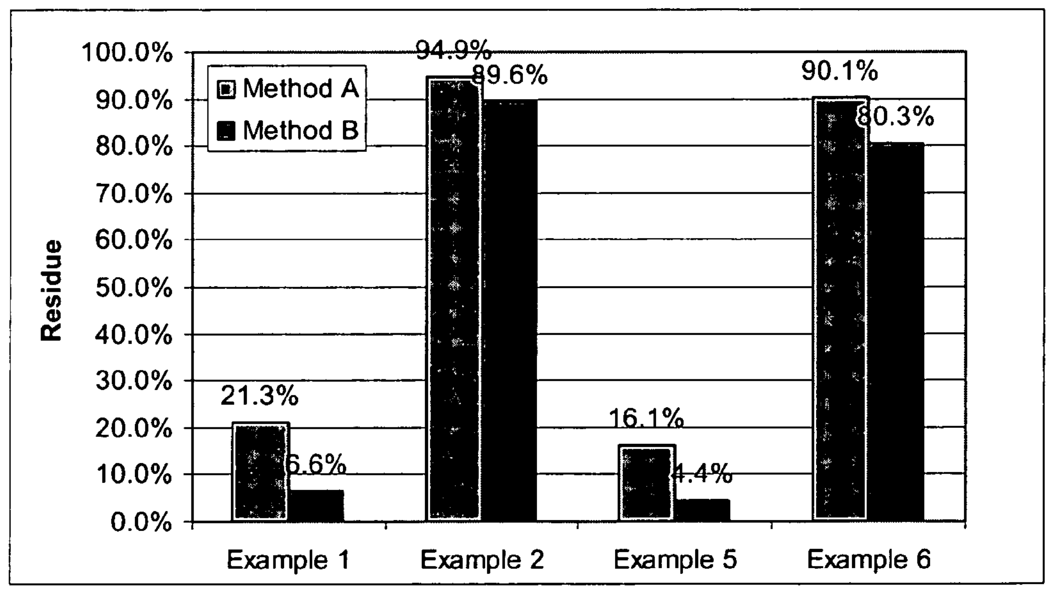
FIG. 16 shows a plot of the results obtained in Results of the sieve tests for examples A, B, C, F, G and two comparative examples with Bayferrox® 130 C (different samples).

The results of the sieve tests according to methods A and B, with the granulates of the compaction tests IIa, i.e. examples A, B, C, G, and F, and two comparative examples of the prior art containing Bayferrox® 130 pigment are shown in FIG. 16.

For examples A, B, C, and G with the disintegration agent according to the invention according to method A, 26%, 75%, 67%, and 57%, respectively, and according to method B, 2%, 35%, 28%, and 18%, respectively, of the original granulate remain on the sieve after the contact with water. For the granulates without the disintegration agent, according to method A, 93% and 96%, and according to method B, between 82% and 87% of the granulate is found on the sieve after the contact with water.

The invention claimed is:

1. A pigment concentrate for coloring a substrate, comprising granulates of:

(a) at least one pigment and (b) at least one disintegrating agent comprising non-derivatized cellulose that is substantially insoluble in water at 20° C., the cellulose being a type having the property of essentially completely disintegrating the granulates, releasing the pigment, within one minute, without any mechanical agitation, the cellulose comprising 70 wt.-% or less of crystalline material and 30 wt.-% or more of amorphous material.

2. The pigment concentrate in accordance with claim 1, in which the granules leave, after single immersion in water as a single layer distribution on a 200 μm mesh sieve for 10 seconds, not more than 75% of the original weight of the pigment concentrate remaining on the sieve.

3. The pigment concentrate in accordance with claim 1, in which the granules leave, after tenfold immersion in water on a 200 μm mesh sieve, not more than 65% of the original weight of the pigment concentrate remaining on the sieve, wherein the total contact time with water is 30 seconds.

4. The pigment concentrate according to claim 1, in which the cellulose comprises native cellulose, spherical cellulose, or a combination of native and spherical cellulose.

5. The pigment concentrate according to claim 1, in which the disintegrating agent comprising cellulose fibers having a fiber length from 10 μm to 2,000 μm.

6. The pigment concentrate according to claim 1 provided with a content of the disintegrating agent of up to 10% by weight (based on dry concentrate).

7. The pigment concentrate according to claim 1 in the form of a spray granulate, a built-up granulate, a press granulate, an extrusion granulate, or a compacted granulate.

8. The pigment concentrate according to claim 1 in which the granules further comprise a binding, dispersing or wetting agent.

9. The pigment concentrate according to claim 1, in which the pigment includes at least one inorganic pigment.

10. The pigment concentrate according to claim 1, in which the pigment includes iron oxide, cobalt oxide, titanium oxide, carbon black, or chrome oxide.

11. The pigment concentrate according to claim 1 in which the granulates have a water content of less than 10% by weight.

12. The pigment concentrate according to claim 6, wherein said disintegrating agent comprises cellulose fibers having particle sizes from 10 μm to 500 μm.

13. The pigment concentrate according to claim 6, wherein said disintegrating agent comprises cellulose fibers having particle sizes from 10 μm to 200 μm.

14. The pigment concentrate according to claim 6, wherein said disintegrating agent comprises cellulose fibers having particle sizes from 20 μm to 35 μm.

* * * * *